United States Patent
Chang

(10) Patent No.: US 10,152,491 B2
(45) Date of Patent: Dec. 11, 2018

(54) FILE SEARCHING METHOD AND IMAGE PROCESSING DEVICE THEREOF

(71) Applicant: NOVATEK Microelectronics Corp., Hsin-Chu (TW)

(72) Inventor: Wei-Chung Chang, Taipei (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 260 days.

(21) Appl. No.: 14/555,720

(22) Filed: Nov. 28, 2014

(65) Prior Publication Data

US 2016/0012076 A1 Jan. 14, 2016

Related U.S. Application Data

(60) Provisional application No. 62/023,182, filed on Jul. 11, 2014.

(30) Foreign Application Priority Data

Oct. 1, 2014 (TW) .............................. 103134311 A

(51) Int. Cl.
*G06F 17/30* (2006.01)

(52) U.S. Cl.
CPC .............................. *G06F 17/30218* (2013.01)

(58) Field of Classification Search
CPC ............... G06F 17/30; G06F 17/30218; G06F 17/30156; G06F 17/30384; G06F 17/30106
USPC .................................................. 707/600–899
See application file for complete search history.

(56) References Cited

U.S. PATENT DOCUMENTS

| | | | | |
|---|---|---|---|---|
| 2004/0103093 | A1* | 5/2004 | Furuhashi | G06F 17/30247 |
| 2007/0077025 | A1* | 4/2007 | Mino | G06F 17/30256 |
| | | | | 386/241 |
| 2008/0138783 | A1* | 6/2008 | Karkanias | G09B 7/02 |
| | | | | 434/322 |
| 2012/0084276 | A1* | 4/2012 | Heimendinger | G06F 17/30047 |
| | | | | 707/708 |
| 2012/0147269 | A1* | 6/2012 | Cho | H04N 5/4448 |
| | | | | 348/552 |

FOREIGN PATENT DOCUMENTS

| | | |
|---|---|---|
| CN | 1360267 A | 7/2002 |
| CN | 1591428 A | 3/2005 |
| CN | 1679323 A | 10/2005 |
| CN | 102402582 A | 4/2012 |
| TW | I237506 | 8/2005 |
| TW | 201112017 A1 | 4/2011 |
| TW | 201224799 A1 | 6/2012 |

* cited by examiner

*Primary Examiner* — Isaac M Woo
(74) *Attorney, Agent, or Firm* — Winston Hsu

(57) ABSTRACT

A file searching method for searching an original image file in an image processing device is provided, wherein the original image file includes a plurality of original image fragments and each of the plurality of original image fragments includes a plurality of key values. The file searching method includes receiving at least one searching condition; obtaining at least one corresponding key value among the plurality of key values according to the at least one searching condition; and searching at least one searching image fragment among the plurality of original image fragments meeting the at least one searching condition.

24 Claims, 7 Drawing Sheets

FILE SEARCHING METHOD AND IMAGE PROCESSING DEVICE THEREOF

CROSS REFERENCE TO RELATED APPLICATIONS

This application claims the benefit of U.S. Provisional Application No. 62/023,182, filed on Jul. 11, 2014 and entitled "Monitoring Device and File Management Method thereof and File Searching Method" the contents of which are incorporated herein in their entirety.

BACKGROUND OF THE INVENTION

1. Field of the Invention

The present invention relates to a file searching method and image processing device thereof, and more particularly, to a file searching method and image processing device thereof capable of searching key values of original image fragments according to desirable searching condition, to quickly obtain desirable searching image fragments meeting the searching condition.

2. Description of the Prior Art

In order to record images longer and prevent image file from being damaged by power cut or shutdown, a conventional monitoring device with loop recording capability (e.g. an event data recorder) stores an image file in a store unit (e.g. a Memory Card) of the monitoring device every period of time (e.g. 2-5 minutes). Thus, if unpreventable factor damages the currently recorded image file, only a short period of image data is lost. In addition, when the store unit has no available space, the monitoring device automatically searches and deletes the earliest image file to accommodate new image files. In other words, each image file only has a short reserving period.

Currently, in addition to recording, the monitoring device can further utilize other sensing units to obtain extra information such as GPS information, road name, speed, direction, time etc. During recording, these extra obtained information is also combined with the image to be stored in the image file.

In general, a user can read a plurality of image files from the store unit of the monitoring device. When the user intends to search an image with a specific time or a specific road from a plurality of image file, since the image file is stored in a unit of a period of time, the user has to look for an image file close to the specific time from the plurality of image files, and then watch the image file to look for the specific image; or the user has to look for an image file recorded in the specific road from the plurality of image file, and then if a plurality of image files are recorded on the same road, the user has to watch these image files one by one to look for the specific image. Whether looking for an image with a specific time or a specific road, it requires manpower for searching. When there are a lot of image files in the store unit, it costs a lot of time.

Nowadays, polices or people often distribute messages via Internet to ask an image with a specific time and a specific road to clarify car accident or criminal case, but it is often in vain. The reasons includes: 1. the messages distributed via Internet has no specific distribution medium, and thus many message cannot be transmitted timely, and the messages are passively received by people with the monitoring devices; 2. since it requires manpower to search a specific image from a lot of image files, few people will searches the particular image file from the store unit of the monitoring device; 3. since the monitoring device performs loop recording, the image file includes the specific image may be deleted during loop recording.

Regarding the current monitoring device, it requires manpower and costs time to search the image file with the specific image. Besides, the image file with the specific image only has a short reserving period, if the user does not search the specific image in time, the image file including the specific image may be deleted when the monitoring device performs loop recording. Therefore, how to effectively search the specific image in the image file recorded by the monitoring device, or even to lock the specific image has become an important issue in the industry.

SUMMARY OF THE INVENTION

It is therefore an objective of the present invention to provide a file searching method and image processing device thereof capable of searching key values of original image fragments according to desirable searching condition, to quickly obtain desirable searching image fragments meeting the searching condition.

A file searching method is provided for searching an original image file in an image processing device, wherein the original image file comprises a plurality of original image fragments and each of the plurality of original image fragments comprises a plurality of key values. The file searching method comprises receiving at least one searching condition; obtaining at least one corresponding key value among the plurality of key values according to the at least one searching condition; and searching at least one searching image fragment meeting the at least one searching condition from the plurality of image fragments.

An image processing device is provided. The image processing device includes an image store unit, for storing an original image file, wherein the original image file comprises a plurality of original image fragments and each of the plurality of original image fragments comprises a plurality of key values; and a processing unit, for receiving at least one searching condition, obtaining at least one corresponding key value among the plurality of key values according to the at least one searching condition, and searching at least one searching image fragment meeting the at least one searching condition from the plurality of image fragments.

These and other objectives of the present invention will no doubt become obvious to those of ordinary skill in the art after reading the following detailed description of the preferred embodiment that is illustrated in the various figures and drawings.

DETAILED DESCRIPTION

The attached figures and below embodiments can be referred to make description of the present invention clearer and more complete. The same symbols in figures represent the same or similar elements, but the provided embodiments are not utilized for limiting the scope of the present invention, and the description of the structure operations are not utilized for limiting executing order. Any structure reconstituted from the elements and generating the same effects belong to the scope of the present invention. On the other hand, elements and steps known by those skilled in the art not described in the embodiments to avoid unnecessary limitation to the present invention.

The present invention provides a monitoring device. Noticeably, the embodiment can be altered into other image processing device (e.g. a computer device receiving an original image file for searching and processing), and is not limited to a monitoring device.

Figure 1:
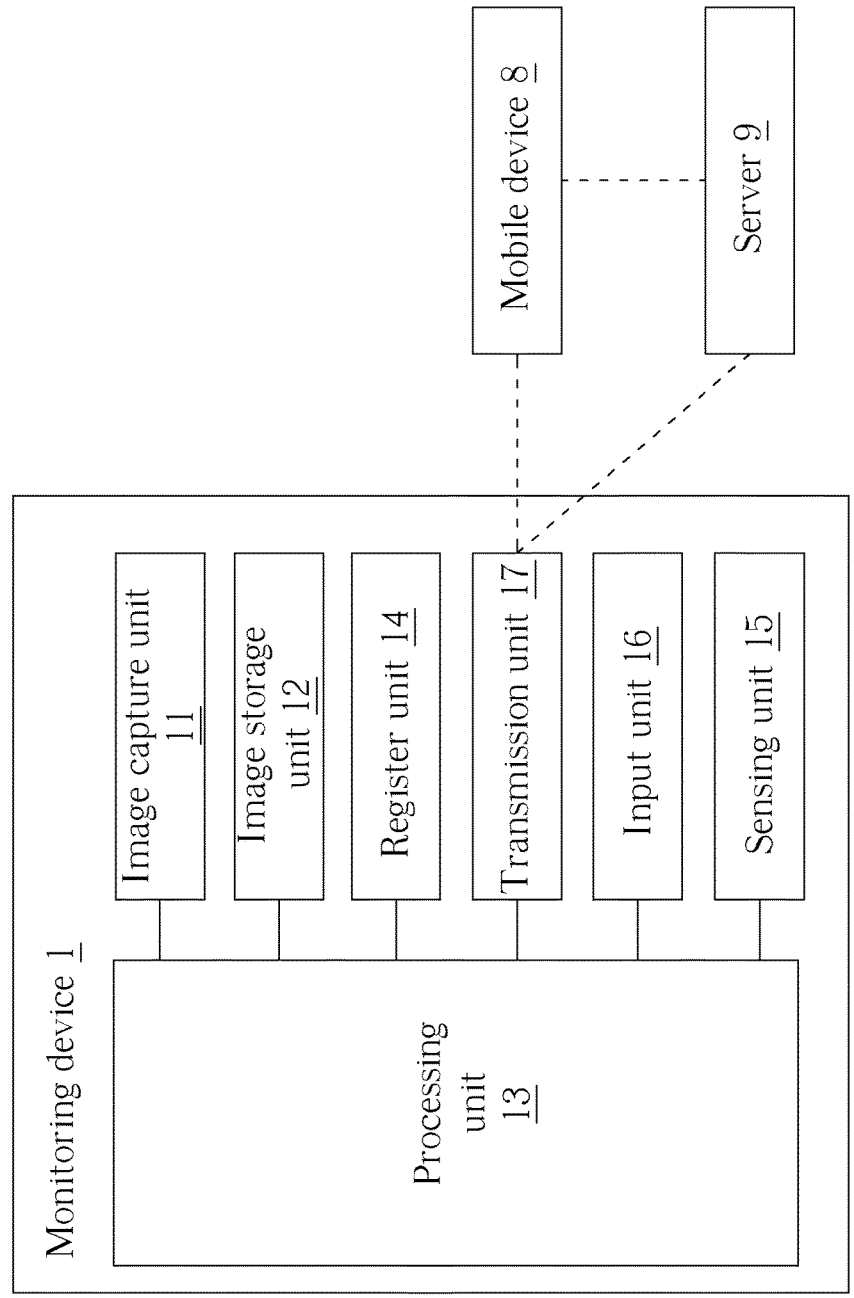
FIG. 1 is a block diagram of a monitoring device according to an embodiment of the present invention.

Please refer to FIG. 1, which is a block diagram of a monitoring device 1 according to an embodiment of the present invention. As shown in FIG. 1, the monitoring device 1 comprises an image capture unit 11, an image storage unit 12, a processing unit 13, a register unit 14 and a sensing unit 15. In the structure, the image capture unit 11, the image storage unit 12, the register unit 14 and the sensing unit 15 are all electrically connected to the processing unit 13. In operating, the image capture unit 11 captures images. For example, the image capture unit 11 can be a camera of an event data recorder for capturing images within a visible range. The processing unit 13 combines images captured during a period of time into an original image file every the period of time (e.g. 2-5 minutes). The image storage unit 12 (e.g. a SD card) stores the original image file, wherein the original image file comprises a plurality of original image fragments sorted according to time sequence (noticeably, in practical operation, the plurality of original image fragments can also be sorted not according to time sequence, but are sorted according to other conditions or not sorted), and each of the plurality of original image fragments comprises a plurality of key values, wherein a key value is a record value for recording related information of a corresponding original image fragment (e.g. time, location of the captured image). The processing unit 13 appends a sequence number to each of the plurality of original image fragments according to the time sequence of the plurality of original image fragments to form a plurality of sequence image fragments (noticeably, in practical operation, the processing unit 13 can also append the sequence number to each of the plurality of original image fragments according to other conditions rather than the time sequence).

The above processing unit 13 can be implemented by software, hardware and/or firmware. For example, if the executing speed and accuracy is primary consider, the processing unit 13 can be mainly implemented by hardware and/or firmware; if design flexibility is primary consider, the processing unit 13 can be mainly implemented by software; otherwise, the processing unit 13 can be simultaneously implemented by software, hardware and firmware. Noticeably, there are no better one in the above examples, and are not utilized for limiting the scope of the present invention. Those skilled in the art can flexibly implement the processing unit 13 according to practical requirement.

Figure 2:
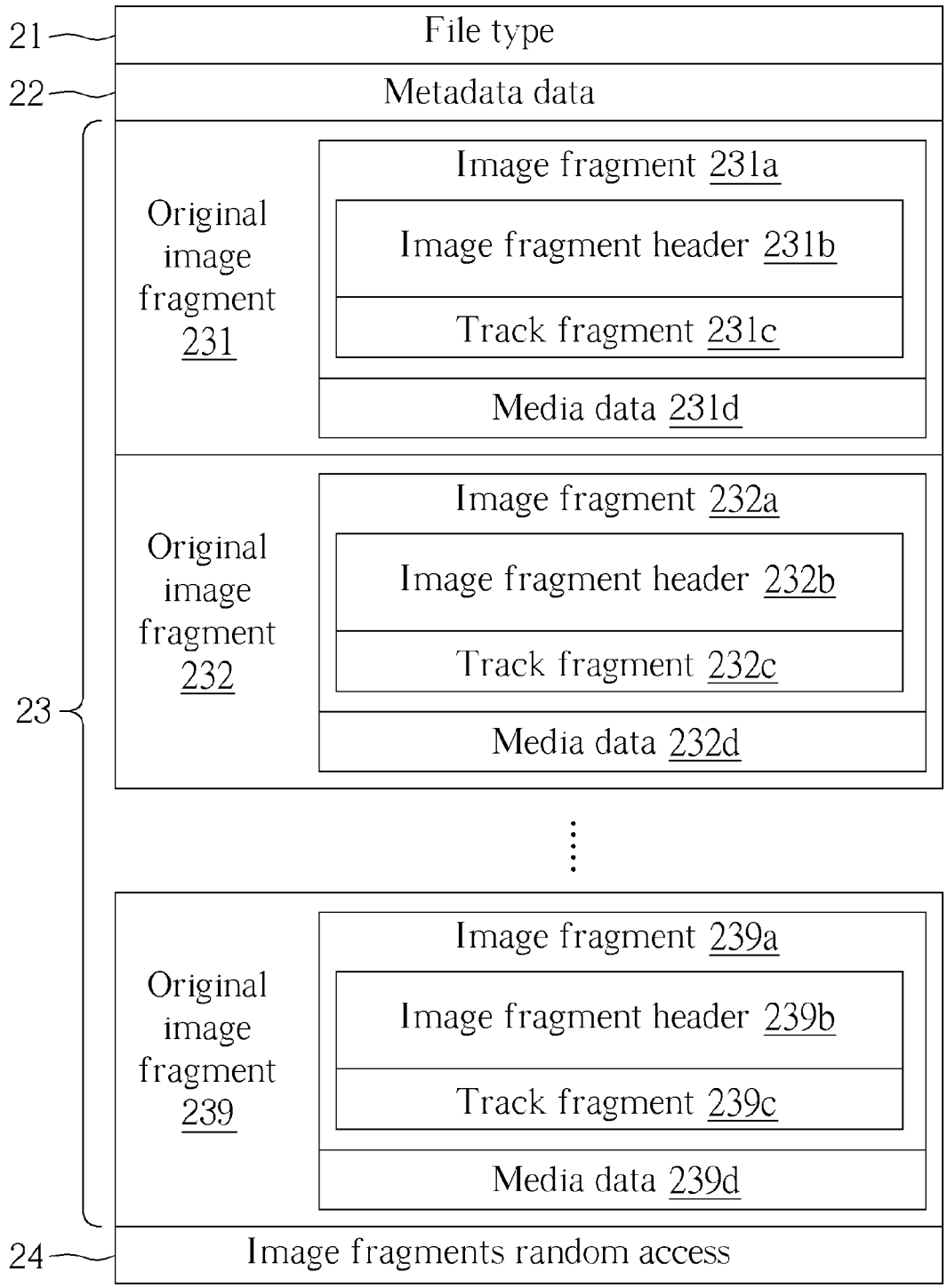
FIG. 2 is a schematic diagram of an original image file according to an embodiment of the present invention.

In an embodiment, the original image file can be a fragmented-structured image file (Fragment, e.g. MPEG4). Please refer to FIG. 2, which is a schematic diagram of an original image file 2 according to an embodiment of the present invention. As shown in FIG. 2, the original image file 2 comprises a file type (File Type, ftyp) 21, an metadata data (Movie Metadata, moov) 22, an original image fragment combination 23 and an image fragment random access (Movie Fragment Random Access, mfra) 24. The original image fragment combination 23 comprises a plurality of original image fragments (Fragment) 231-239 sorted according to the time sequence (noticeably, in practical operation, the plurality of original image fragments 231-239 can also be sorted not according to time sequence, but are sorted according to other conditions or not sorted). Each of the original image fragments 231-239 comprises image fragments (Movie Fragment, moof) 231a-239a and media data (Media Data, mdat) 231d-239d. Each of the image fragments 231a-239a further comprises image fragments headers (Movie Fragment Header, mfhd) 231b-239b and track fragments (Track Fragment, traf) 231c-239c, wherein the image fragments header 231b-239b are fragment indexes of each of the original image fragments 231-239.

In practice, the image recorded in the media data 231d-239d of the original image fragments 231-239 is usually 1 second-long. If the processing unit 13 combines images into the original image file 2 every 5 minutes, an original image file 2 will have 300 original image fragments.

Furthermore, as shown in FIGS. 1, 2, the sensing unit 15 obtains extra information, e.g. GPS information, speed, direction, time etc., related to an image according to a sample rate (e.g. sampling once every 1 second, or sampling once every 5 second). When the image capture unit 11 captures images, the processing unit 13 combines the extra obtained information with the images, and stores in the original image file 2 together. These extra obtained information will be recorded in a form of key values in the track fragments 231c-239c of each of the original image fragments 231-239 of the original image file 2. In other words, the extra information related to the media data 231d-239d in each of the original image fragments 231-239 can be obtained from the track fragments 231c-239. For example, GPS information, road name, speed, direction, time etc. are all key values, and the track fragments 231c-239c of each of the original image fragments 231-239 comprises these key values, and these key values are even sorted according to priority of each key value depending on user's requirement.

When the image capture unit 11 starts to capture images, in addition to recording key values in the track fragments 231c-239c of the original image fragments 231-239, the processing unit 13 also appends a sequence number in the track fragments 231c-239c according to the time sequence of generating the original image fragments 231-239 (noticeably, in practical operation, the processing unit 13 can also append the sequence number to each of the plurality of original image fragments according to other conditions rather than the time sequence), such that the track fragments 231c-239c comprises both the key values and the sequence numbers, wherein sequence numbers are added up. After the processing unit 13 appends the sequence numbers to the track fragments 231c-239c, the original image fragments 231-239 stored in the image storage unit 12 form sequence image fragments. In other words, the sequence image fragments corresponding to the original image fragments 231-239 will be stored in the image storage unit 12, and the track fragments of the sequence image fragments will comprise the key values and the sequence numbers.

The sequence numbers are stored in the register unit 14. In practice, the register unit 14 can be non-volatile memory device (e.g. ROM, EERPOM, Flash). When the monitoring device 1 reboots, the processing unit 13 can obtain the last sequence number appended to the track fragments 231c-239c from the register unit 14, and then appends a sequence number after the last appended sequence number to a new track fragment. As a result, in the image storage unit 12, all sequence numbers appended to the track fragments 231c-239c of the sequence image fragments are different, and the time sequence of all sequence image fragments can be learned from the sequence numbers of the track fragments 231c-239c.

The processing unit 13 can receive at least one searching condition, and the processing unit 13 obtains at least one corresponding key value among the plurality of key values according to the at least one searching condition, and then searches searching image fragments meeting the searching condition from the plurality of sequence image fragments of the image storage unit 12 (the processing unit 13 can also search searching image fragments meeting the searching condition from the original image fragments 231-239).

The at least one searching condition can be corresponding to a single key value (e.g. road name) or multiple key values (e.g. road name, direction). The processing unit 13 searches the searching image fragments meeting the searching condition from the image storage unit 12 accordingly, and stores the searching image fragments in the image storage unit 12 to form the searching image fragments. Otherwise, the processing unit 13 can search the searching image fragments meeting the searching condition from the image storage unit 12 according to the priority of the plurality of key values corresponding to the searching condition, and store the searching image fragments in the image storage unit 12 to form the searching image fragments.

When the processing unit 13 searches the searching image fragments meeting the searching condition from the image storage unit 12 according to the searching condition, the processing unit 13 sorts the searching image fragments according to the sequence numbers of the searching image fragments, In other words, the searching image fragments can be arranged according to the time sequence.

Noticeably, in the above embodiments, the original image file 2 is a fragmented-structured image file, and stores each image fragment with a specific length, which facilitates storing and searching, but in other embodiments, the original image file can also be image files with other structures.

Figure 3:
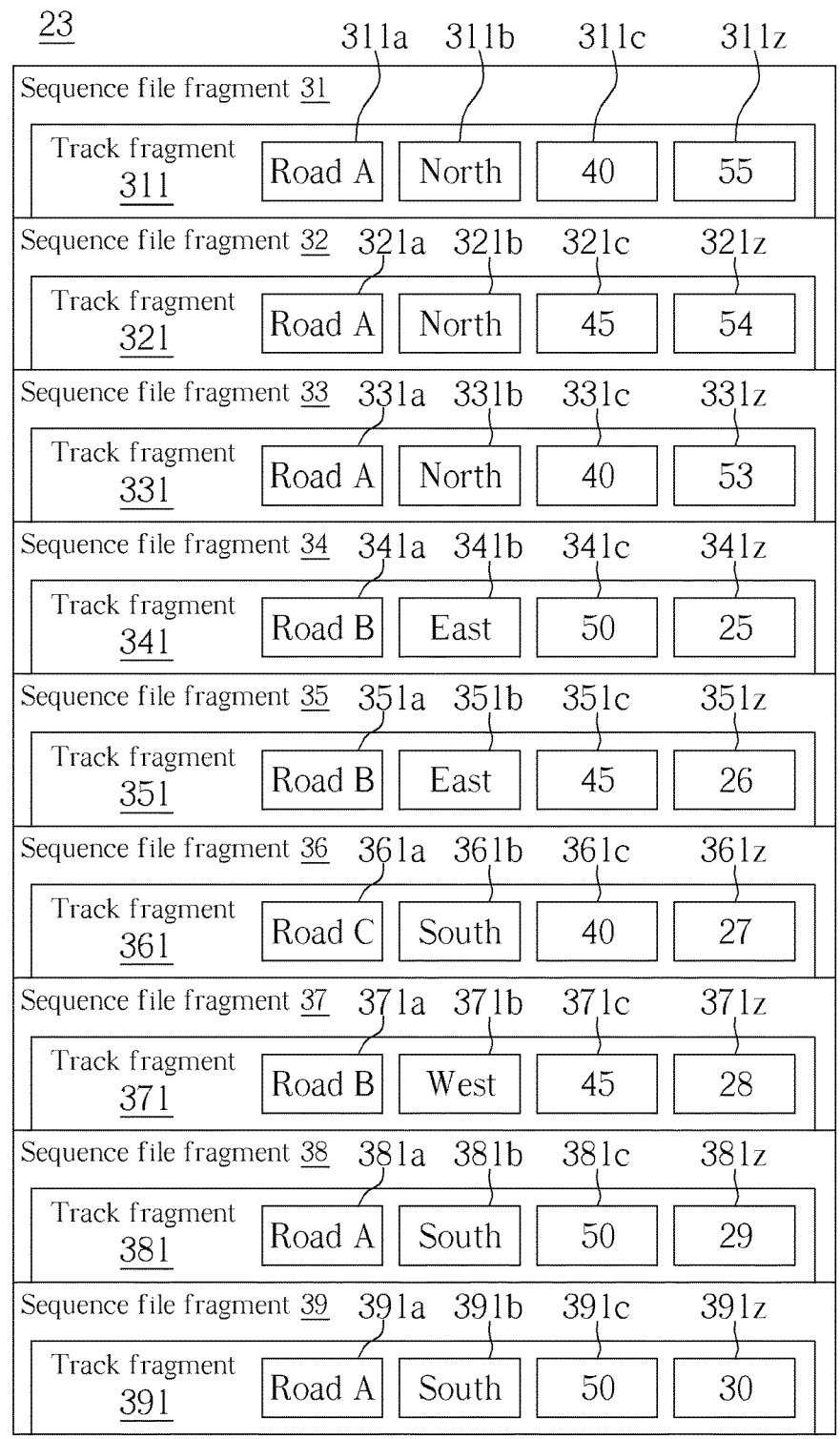
FIG. 3 is a schematic diagram of an original image fragment according to FIG. 2 of the present invention.

Please refer to FIG. 3, which is a schematic diagram of an original image fragment 23 according to FIG. 2 of the present invention. As shown in FIGS. 1, 3, the original image fragment 23 comprises sequence image fragments 31-39, and each of the sequence image fragments 31-39 comprises an image fragment (moof) and a media data (mdat), and all the image fragments (moof) comprises respective image fragment headers (mfhd) and track fragments (traf) 311-391. For simplicity, with the structure of the sequence image fragments 31-39 unchanged, FIG. 3 and following FIGS. 4A, 4B, 4C only illustrate sequence image fragments and track fragments related to the searching condition.

Each of the track fragments 311-391 has the same number (e.g. 3) but different types (e.g. road name, direction, speed) of key values 311a-391a, 311b-391b, 311c-391c and a sequence number 311z-391z, wherein the number of key values can increase or decrease according to practical requirement, and are not limited to this. The track fragments 311 comprises the key values 311a, 311b, 311c and the sequence number 311z, the track fragments 321 comprises the key values 321a, 321b, 321c and the sequence number 321z, and other track fragments 331-391 comprises a plurality of key values and corresponding sequence numbers can be derived by the same token, which is not narrated hereinafter.

For example, the key values 311a-391a record road names obtained by the sensing unit 15, the key values 311b-391b record directions obtained by the sensing unit 15, the key values 311c-391c record speeds obtained by the sensing unit 15, and the sequence numbers 311z-391z are non-repetitive positive integers.

In an embodiment, the sequence image fragments 31-39 can utilize the priority of the key values as the searching condition. For example, the road name is the most important key value, the direction is the second most important key value, and the speed is the least important key value. The processing unit 13 searches and classifies the sequence image fragments 31-39 according to the key value 311a-391a first. The key value 311a-391a comprise the road A, the road B, and the road C, and thus the processing unit 13 searches and classifies the sequence image fragments 31-39 according to the road A, the road B, and the road C, respectively.

Figure 4A:
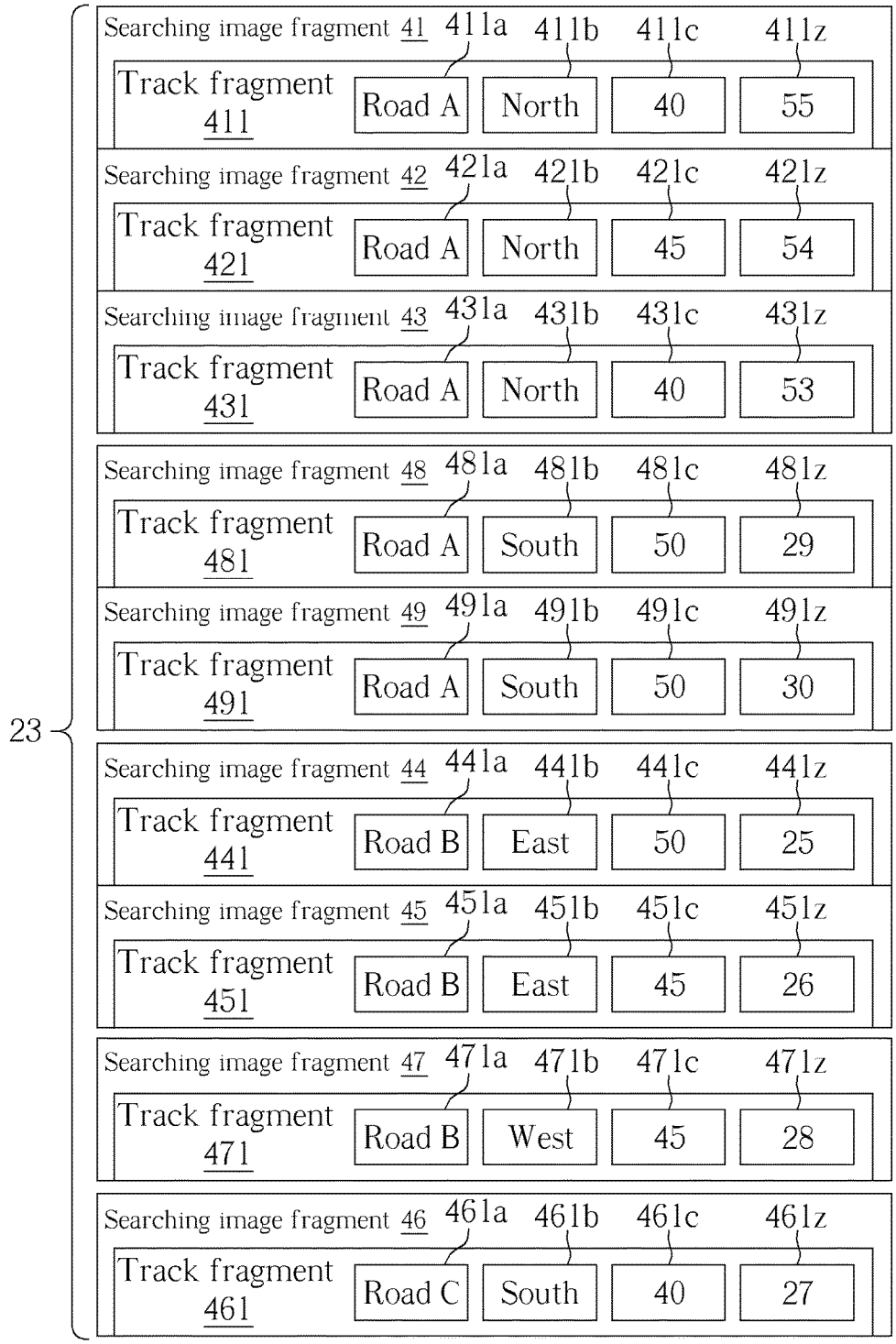
FIG. 4A is a schematic diagram of searching image fragments according to FIG. 3 of the present invention.

FIG. 4A is a schematic diagram of a searching image fragments 41-49 according to FIG. 3 of the present invention. As shown in 1, 3, 4A, after the processing unit 13 searches the sequence image fragments 31-39 according to the key values 311a-391a, the processing unit 13 classifies the searching image fragments 41-43, 48-49 related to the road A, the searching image fragments 44-45, 47 related to the road B, and the searching image fragments 46 related to the road C. Each of the searching image fragments 41-49 comprises the track fragments 411-491, and each of the track fragments 411-491 comprise key values 411a-491a, key values 411b-491b, key values 411c-491c and sequence numbers 411z-491z. The processing unit 13 searches and classifies the searching image fragments 41-49 according to directions. In more detail, the processing unit 13 searches and classifies the searching image fragments 41-43, 48-49 related to the road A according to directions. Similarly, the processing unit 13 searches and classifies the searching image fragments 44-45, 47 related to the road B according to directions, In addition, since only the searching image fragments 46 is related to the road C, the processing unit 13 does not need to search and classify the searching image fragments 46 related to the road C according to direction.

Figure 4B:
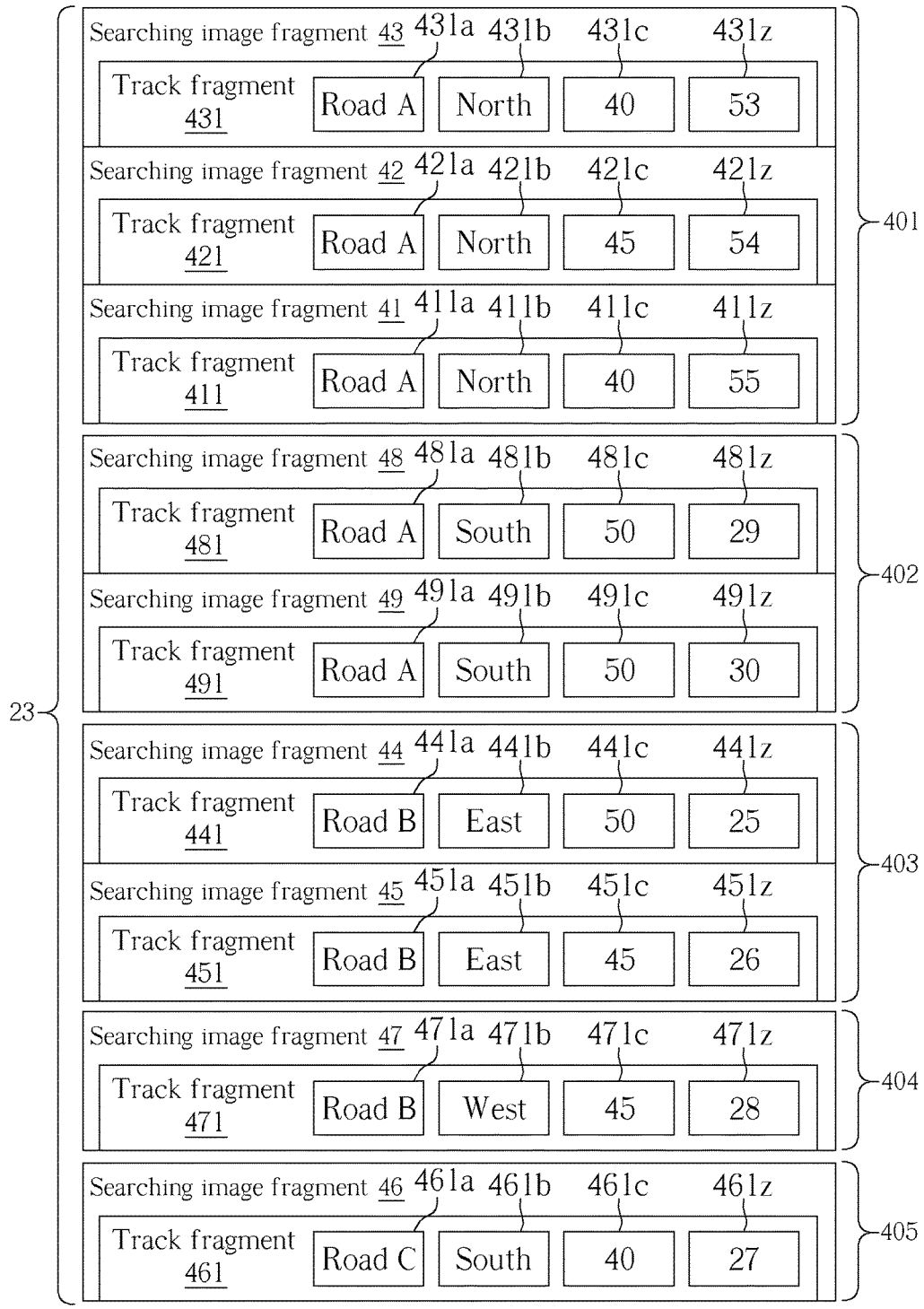
FIG. 4B is a schematic diagram of the searching image fragments sorted after classification according to FIG. 4A of the present invention.

As stated in the above, the sequence numbers 411z-491z can represent the time sequence of the searching image fragments 41-49. FIG. 4B is a schematic diagram of the searching image fragments 41-49 sorted after classification according to FIG. 4A of the present invention. As shown in FIGS. 1, 4B, the processing unit 13 sorts the searching image fragments 41-49 from small to large according to the sequence numbers 411z-491z. For example, for the searching image fragments 41-43 with a road name of the road A and a direction of north, the processing unit 13 sorts the searching image fragments 41-43 from small to large according to the sequence numbers 411z, 421z, 431z, to form the final sorted result. As a result, i.e. the sequence is: the searching image fragment 43, the searching image fragment 42, the searching image fragment 41, so as to combine the searching image fragment 43, the searching image fragment 42, the searching image fragment 41 into a searching image fragment combination 401. Sorting of other searching image fragment combinations 402-405 can be derived by the same token, and is not narrated hereinafter.

In another embodiment, as shown in FIGS. 1, 3, 4B, the processing unit 13 can sort the sequence image fragments 31-39 according to the sequence numbers 311z-391z first, and then search the sequence image fragments 31-39 according to priority of the key values to form the searching image fragments 41-49, so as to perform combination to form the searching image fragment combinations 401-405.

Figure 4C:
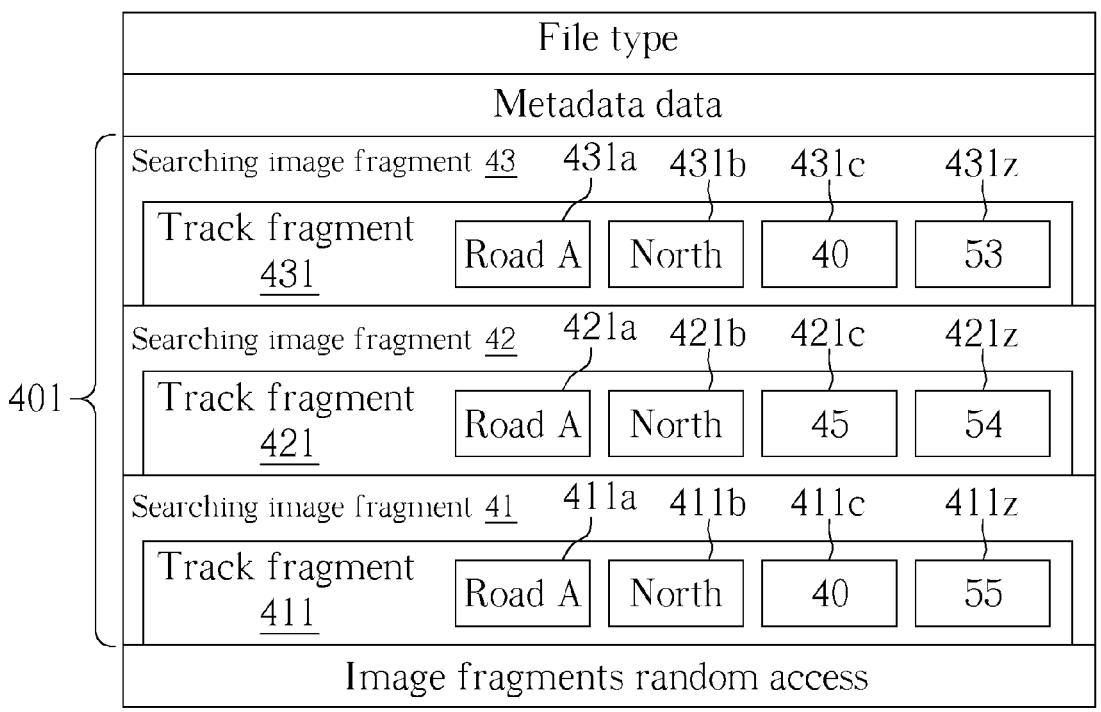
FIG. 4C is a schematic diagram of a searching image file according to FIG. 4B of the present invention.

FIG. 4C is a schematic diagram of a searching image file 4 according to FIG. 4B of the present invention. As shown in FIG. 4C, take the searching image fragment combination 401 as example, after the processing unit 13 combines the searching image fragment combination 401, the processing unit 13 utilizes cutting and editing method of fragmented structure to combine the searching image fragment combination 401 with the file type (ftyp), the metadata data (moov) and the image fragment random access (mfra) to form the searching image file 4, wherein the searching image file 4 is also stored in the image storage unit 12, and the searching image file 4 is related to all captured image data related to the road A and the direction of north, and the image data of the searching image file 4 is arranged according to the time sequence.

As shown in 1, 3, 4A-4C, in another embodiment, the sequence image fragments 31-39 can be searched according to searching condition corresponding to the key values interested by the user. For example, the user considers the road name is the most important key value, the direction is the second most important key value, and the speed is the least important key value. The processing unit 13 searches the sequence image fragments 31-39 according to priority of the key values to form the searching image fragments 41-49, and then sorts the searching image fragments 41-49 from small to large according to the sequence numbers 411z-491z, so as to perform combination to form the searching image fragment combinations 401-405. Otherwise, the processing unit 13 sorts the sequence image fragments 31-39 according to the sequence numbers 311z-391z first, and then searches the sequence image fragments 31-39 according to the key values interested by the user sequentially to form the searching image fragments 41-49, so as to perform combination to form the searching image fragment combinations 401-405. Finally, the processing unit 13 utilizes cutting and editing method of fragmented structure to combine the searching image fragment combinations 401-405 with the file types (ftyp), the metadata data (moov) and the image fragment random accesses (mfra), to form the searching image file 4, wherein searching image file 4 is also stored in the image storage unit 12.

On the other hand, as shown in FIG. 1, in an embodiment, the monitoring device 1 further comprises an input unit 16 (e.g. key, touch control panel). The input unit 16 is electrically connected to the processing unit 13, and the user can input a searching instruction corresponding to the searching condition via the input unit 16. After the processing unit 13 receives the searching instruction, the processing unit 13 searches searching image fragments meeting the searching condition from the plurality of sequence image fragments accordingly (the processing unit 13 can also search searching image fragments meeting the searching condition from the original image fragments 231-239), and the processing unit 13 can further sort the searching image fragments according to the time sequence to form the searching image file. The user can view the image data meeting searching condition and arranged according to the time sequence in the searching image file.

Noticeably, the spirit of the above embodiment is to search searching image fragments meeting the searching condition from the image storage unit 12 according to the searching condition, and thus to quickly obtain the desirable searching image fragments meeting the desirable searching condition. Those skilled in the art can make modification or alterations accordingly. For example, all of the above operations are related to the monitoring device 1 and the captured original image file thereof, but in other embodiments, a computer device can receive the original image file from the monitoring device 1 and then the computer device can perform the above searching and processing. Moreover, in the above embodiment, the monitoring device 1 is utilized in an event data recorder for recording, and thus key values can be GPS information, road name, speed, direction, time etc., but in other embodiments, the monitoring device 1 can be a surveillance camera of a house or a public place, and key values can be a specific color in an image or a variation of a specific position (e.g. when the monitoring device 1 is dedicated to capturing images of lockers, key values can indicate whether each locker is open, and the inputted searching condition can be utilized for searching images of the specific locker being open; otherwise, when a suspect is wearing clothes with a specific color, the inputted searching condition can be utilized for searching images with the specific color).

Besides, nowadays, polices or people often ask an image with a specific time and a specific road, but often passively wait for response. Moreover, the monitoring device performs loop recording, and the image with the specific time and the specific road may be deleted during loop recording. By connecting the monitoring device 1 of the present invention with a server 9 of a monitoring center, the monitoring center can actively search the image with the specific time and the specific road by connecting with the monitoring device 1, and the image can be locked (i.e. the image is not deleted by loop recording or reserved permanently) after being searched, to facilitate polices or people to find out intended image. The user of the monitoring device 1 can register to the monitoring center and apply a membership. In addition to ask image from other members via the server 9 of the monitoring center, the user can also share stored image of the monitoring device 1 to other members.

For example, in an embodiment, as shown in FIG. 1, the monitoring device 1 further comprises a transmission unit 17, e.g. a long distance communication module of wireless communication such as a 3G communication module, a 4G communication module etc. The transmission unit 17 is electrically connected to the processing unit 13, and is utilized for performing remote internet data transmission between the processing unit 13 and the server 9 of the monitoring center. When the processing unit 13 receives the searching instruction corresponding the searching condition (e.g. road name, time) transmitted from the server 9 via the transmission unit 17, the processing unit 13 searches the searching image fragments meeting the searching condition accordingly, and locks the searching image fragments, i.e. force the monitoring device 1 not to delete the locked searching image fragments during loop recording. In the meantime, the monitoring center displays messages to the user of the monitoring device 1 via the monitoring device 1 to ask the user if the user agrees to share the locked searching image fragments. Once the user agrees to share the locked searching image fragments, the processing unit 13 transmits the locked searching image fragments to the server 9 via the transmission unit 17. If the user disagrees to share the locked searching image fragments, the processing unit 13 unlocks the locked searching image fragments.

In another embodiment, the transmission unit 17 is utilized for performing data transmission between the processing unit 13 and a mobile device 8, i.e. the transmission unit 17 only comprises a short distance communication module of wireless communication such as Wi-Fi, Bluetooth etc., and has to establish connection to the server 9 of the monitoring center via the application program of the mobile device 8. When the processing unit 13 receives a searching instruction corresponding to the searching condition (e.g. road name, time) transmitted to the mobile device 8 from the server 9 via transmission unit 17, the processing unit 13 searches the searching image fragments meeting the searching condition accordingly, and locks the searching image fragments. In the meantime, the monitoring center displays messages to the user of the monitoring device 1 via the mobile device 8 to ask the user if the user agrees to share the locked searching image fragments. Once the user agrees to share the locked searching image fragments, the processing unit 13 transmits the locked searching image fragments to the server 9 sequentially via the transmission unit 17 and the mobile device 8. If the user disagrees to share the locked searching image fragments, the processing unit 13 unlocks the locked searching image fragments.

Figure 5:
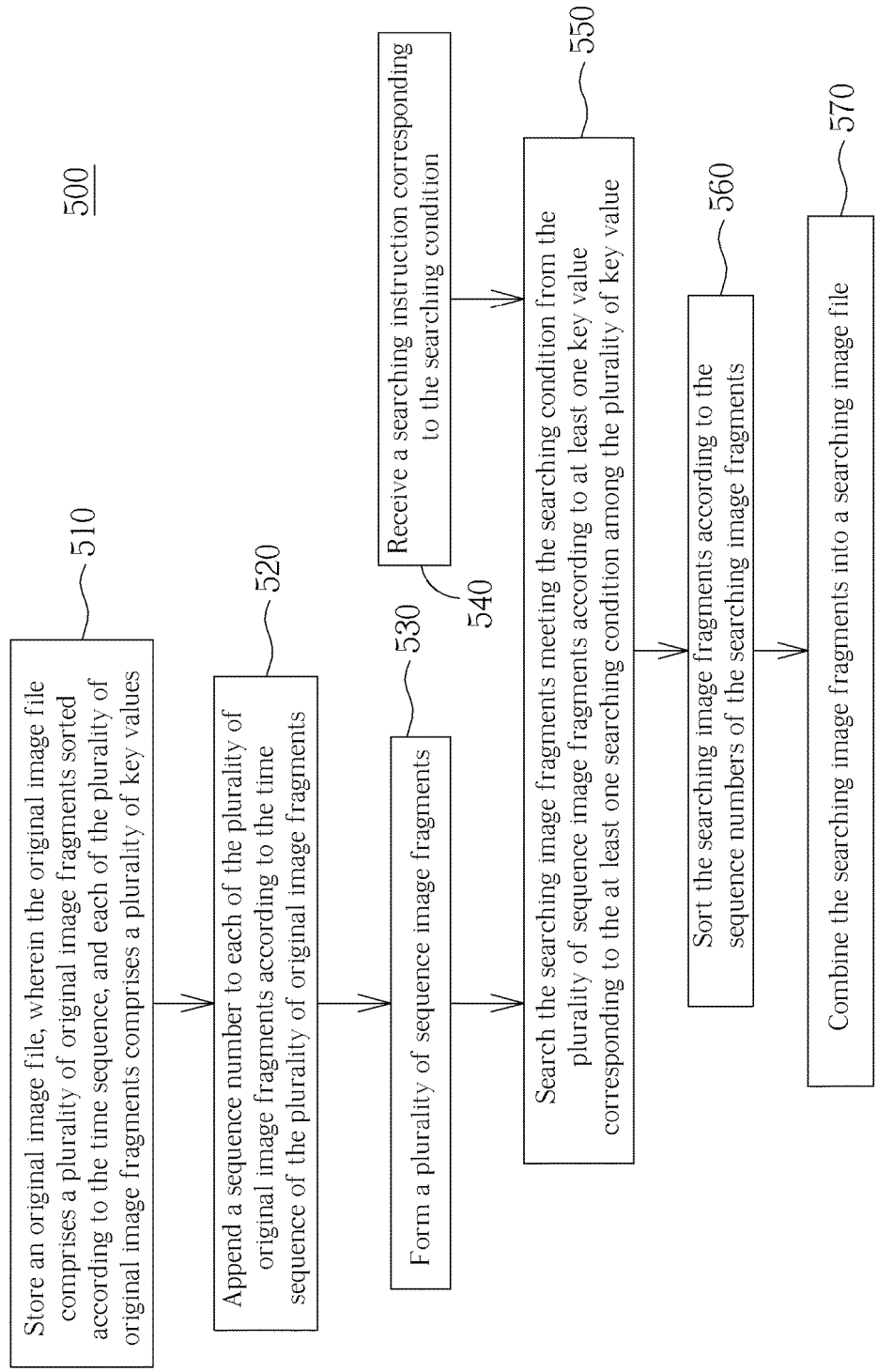
FIG. 5 is a flow chart of a file searching method of a monitoring device according to an embodiment of the present invention.

The above file searching operations of the monitoring device 1 can be summarized into is a file searching method. Please refer to FIG. 5, which is a flow chart of a file searching method 500 of a monitoring device 1 according to an embodiment of the present invention. As shown in FIG. 5, the file searching method 500 of the monitoring device 1 comprises steps 510-570 (noticeably, the steps in this embodiment can be adjusted processing order or even can be executed at the same time or partially at the same time according to practical requirement unless a processing order is specifically defined). For clarity and convenience, the following file searching method 500 is illustrated together with the above embodiment, but is not limited to this. As for the hardware device for implementing the steps, since the above embodiments has specifically described, and thus is not narrated hereinafter.

In the step 510, the embodiment stores an original image file (e.g. fragmented-structured image file such as Fragment MPEG4; the original image file 2 as shown in FIG. 2), wherein the original image file comprises a plurality of original image fragments (Fragment; the original image fragments 231-239 as shown in FIG. 2) sorted according to the time sequence, and each of the plurality of original image fragments comprises a plurality of key values (the key values 311a-391a, 311b-391b, 311c-391c as shown in FIG. 3). In practice, the unit of an original image fragment is usually 1 second, and the key values are extra information, e.g. GPS information, speed, direction, the time sequence etc., related to each of the plurality of original image fragments.

In the step 520, the embodiment appends a sequence number to each of the plurality of original image fragments according to the time sequence of the plurality of original image fragments (the sequence numbers 311z-391z as shown in FIG. 3), wherein the sequence numbers are added up. In the step 530, the original image fragments appended with the sequence numbers form a plurality of sequence image fragments (the sequence image fragments 31-39 as shown in FIG. 3). The steps 510 and 520 are optional steps, and can be implemented or not implemented within different devices.

In the step 540, the embodiment receives a searching instruction corresponding to the searching condition, wherein the searching condition can have a single key value (e.g. road name) or multiple key values (e.g. road name, direction) as the condition, or utilize the priority of a plurality of key values as the condition. The searching instruction corresponding to the searching condition can be a searching instruction corresponding to the searching condition directly inputted from a user, and can also be a searching instruction corresponding to the searching condition transmitted from a server of a monitoring center (the server 9 as shown in FIG. 1) which a monitoring device (the monitoring device 1 as shown in FIG. 1) directly receives from the server or via a mobile device (the mobile device 8 as shown in FIG. 1) when the monitoring device connects to the server.

In an embodiment, when the monitoring device directly connects with the server of the monitoring center via Internet, the monitoring device receives a searching instruction corresponding to searching condition transmitted from the server, and searches the searching image fragments meeting the searching condition accordingly, and locks the searching image fragments, to prevent the searching image fragments meeting the searching condition from being deleted. The locked searching image fragments can be transmitted to the server.

Otherwise, in another embodiment, when the monitoring device connects with the server of the monitoring center via the mobile device and Internet, the monitoring device receives the searching instruction corresponding to the searching condition transmitted from the server, and searches the searching image fragments meeting the searching condition accordingly (the searching image fragments 41-49 as shown in FIG. 4A), and locks the searching image fragments, to prevent the searching image fragments meeting the searching condition from being deleted. The locked searching image fragments can be transmitted to the server via the mobile device.

In the step 550, the embodiment searches the searching image fragments meeting the searching condition from the plurality of sequence image fragments according to at least one key value corresponding to the at least one searching condition among the plurality of key value (for example, the above embodiment searches a plurality of key values of each track fragment of each sequence image fragment according to at least one searching condition such as road name, time etc., and then takes the sequence image fragments with key values meeting at least one searching condition as the searching image fragments meeting searching condition). In the step 560, the embodiment sorts the searching image fragments according to the sequence numbers of the searching image fragments. In the step 570, the embodiment utilizes cutting and editing method of fragmented structure to combine the searching image fragments into a searching image file (the searching image fragment 4 as shown in FIG. 4C).

In the prior art, when the user intends to search an image with a specific time or a specific road from a plurality of image file, the user has to look for an image file close to the specific time from the plurality of image files, and then watch the image file to look for the specific image; or the user has to look for an image file recorded in the specific road from the plurality of image file, which costs a lot of time. Besides, the monitoring device performs loop recording, wherein the image file includes the specific image may be deleted during loop recording, and thus the monitoring cannot preserves the specific image timely.

In comparison, the embodiment searches searching image fragments meeting the searching condition from the image storage unit 12 according to the searching condition, and thus can quickly obtain the desirable searching image fragments meeting the desirable searching condition. Besides, the embodiment can receive searching condition from the server 9 to search and lock searching image fragments meeting the searching condition, so as to timely preserve the specific image and prevent the specific image from being deleted during loop recording.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A file searching method applied in an image processing device, the file searching method comprising:
    obtaining an original image file, wherein the original image file is segmented by time into a plurality of original image fragments, wherein each of the plurality of original image fragments comprises a plurality of key values indicating extra information other than captured images and stored with the captured images and respectively combined into the original image fragments of the original image file;
    receiving at least one searching condition;
    obtaining at least one key value among the plurality of key values, wherein the at least one key value corresponds to the at least one searching condition; and
    searching at least one searching image fragment meeting the at least one searching condition from the plurality of image fragments.

2. The file searching method of claim 1, wherein each of the plurality of original image fragments is appending with a sequence number to form a plurality of sequence image fragments, and the file searching method further comprises:
    sorting the at least one searching image fragment according to the sequence number of each of the at least one searching image fragment.

3. The file searching method of claim 2 further comprising:
    when sorting the at least one searching image fragment according to the sequence number of each of the at least one searching image fragment, combining the at least one searching image fragment into a searching image file.

4. The file searching method of claim 1, wherein the image processing device is a monitoring device generating the original image file, or a computer device receiving the original image file.

5. The file searching method of claim 1, wherein the at least one searching condition is received from a server, the file searching method further comprises:
    locking the at least one searching image fragment; and
    transmitting the at least one locked searching image fragments to the server.

6. The file searching method of claim 5, wherein the step of transmitting the at least one locked searching image fragments to the server comprises:
    transmitting the at least one locked searching image fragments to the server after a user of the image processing device agrees to share the at least one locked searching image fragment.

7. The file searching method of claim 1, wherein the at least one searching condition is received from a server via a mobile device, the file searching method further comprises:
    locking the at least one searching image fragment; and
    transmitting the at least one locked searching image fragments to the server via the mobile device.

8. The file searching method of claim 7, wherein the step of transmitting the at least one locked searching image fragments to the server via the mobile device comprises:
    transmitting the at least one locked searching image fragments to the server via the mobile device after a user of the image processing device agrees to share the at least one locked searching image fragment.

9. The file searching method of claim 1, wherein the at least one searching condition is received from a user of the image processing device.

10. The file searching method of claim 1, wherein the original image file is a fragmented-structured image file.

11. The file searching method of claim 1, wherein the key values are stored in track fragments of each of the original image fragments of the original image file.

12. The file searching method of claim 1, wherein the key values are textual key values.

13. An image processing device, comprising:
    an image store unit, for storing an original image file, wherein the original image file is segmented by time into a plurality of original image fragments and each of the plurality of original image fragments comprises a plurality of key values indicating extra information other than captured images and stored with the captured images and respectively combined into the original image fragments of the original image file; and
    a processing unit, for receiving at least one searching condition, obtaining at least one key value among the plurality of key values, wherein the at least one key value corresponds to the at least one searching condition, and searching at least one searching image fragment meeting the at least one searching condition from the plurality of image fragments.

14. The image processing device of claim 13, wherein the processing unit appends each of the plurality of original image fragments with a sequence number to form a plurality of sequence image fragments, and sorts the at least one searching image fragment according to the sequence number of each of the at least one searching image fragment.

15. The image processing device of claim 14, wherein the processing unit combines the at least one searching image fragment into a searching image file when sorting the at least one searching image fragment according to the sequence number of each of the at least one searching image fragment.

16. The image processing device of claim 13, wherein the image processing device is a monitoring device generating the original image file, or a computer device receiving the original image file.

17. The image processing device of claim 13 further comprising a transmitting unit, for receiving the at least one searching condition from a server, wherein the processing units locks the at least one searching image fragment, and the transmitting unit transmits the at least one locked searching image fragments to the server.

18. The image processing device of claim 17, wherein the transmitting unit transmits the at least one locked searching image fragments to the server after a user of the image processing device agrees to share the at least one locked searching image fragment.

19. The image processing device of claim 13 further comprising a transmitting unit, for receiving the at least one searching condition from a server via a mobile device, wherein the processing unit locks the at least one searching image fragment, and the transmitting unit transmits the at least one locked searching image fragments to the server via the mobile device.

20. The image processing device of claim 19, wherein the transmitting unit transmits the at least one locked searching image fragments to the server via the mobile device after a user of the image processing device agrees to share the at least one locked searching image fragment.

21. The image processing device of claim 13 further comprising an input unit, for receiving the at least one searching condition from a user of the image processing device.

22. The image processing device of claim 13, wherein the original image file is a fragmented-structured image file.

23. The image processing device of claim 13, wherein the key values are stored in track fragments of each of the original image fragments of the original image file.

24. The image processing device of claim 13, wherein the key values are textual key values.

* * * * *